United States Patent [19]

Stonehart

[11] Patent Number: 5,593,934
[45] Date of Patent: Jan. 14, 1997

[54] PLATINUM ALLOY CATALYST

[75] Inventor: Paul Stonehart, Madison, Conn.

[73] Assignees: Tanaka Kikinzoku Kogyo K.K., Japan; Stonehart Associates Inc., Madison, Conn.

[21] Appl. No.: 350,710

[22] Filed: Dec. 7, 1994

Related U.S. Application Data

[63] Continuation-in-part of Ser. No. 167,224, Dec. 14, 1993.

[51] Int. Cl.$^6$ .................................................. B01J 23/42
[52] U.S. Cl. ........................... 502/326; 502/324; 502/334; 502/336; 502/338
[58] Field of Search .................................. 502/326, 324, 502/334, 336, 338

[56] References Cited

U.S. PATENT DOCUMENTS

| | | | |
|---|---|---|---|
| 4,985,386 | 1/1991 | Tsurumi et al. | 502/185 |
| 5,013,618 | 5/1991 | Luczak | 502/324 |
| 5,079,107 | 1/1992 | Jalan . | |
| 5,149,680 | 9/1992 | Kitson et al. | 502/332 |
| 5,225,391 | 7/1993 | Stonehart et al. | 502/324 |

*Primary Examiner*—Asok Pal
*Assistant Examiner*—Bekir L. Yildirim
*Attorney, Agent, or Firm*—Klauber & Jackson

[57] ABSTRACT

Disclosed is a platinum alloy catalyst comprising a carbon support and, platinum, manganese and iron supported thereon. The activities of this platinum alloy catalyst are higher than those of a binary alloy catalyst consisting of platinum and manganese and even of a platinum-nickel-cobalt alloy catalyst which is one of the most active conventional platinum alloy catalysts, and its life is greatly extended. Moreover, it is quite useful when utilized as an electrocatalyst of a fuel cell.

1 Claim, 1 Drawing Sheet

PLATINUM ALLOY CATALYST

RELATED APPLICATIONS

This application is a continuation-in-part of application Ser. No. 08/167,224, filed Dec. 14, 1993.

BACKGROUND OF THE INVENTION

The present invention relates to a catalyst comprising a carbon support and platinum and two other metals thereon, especially to a platinum alloy catalyst employed as an electrocatalyst of a fuel cell.

Catalysts consisting of a carbon support and various catalyst metals chiefly including platinum supported thereon have been heretofore employed as electrocatalysts for various chemical reactions and fuel cells. Further, in order to elevate the catalytic performance, other metals such as nickel and chromium are supported on the support in addition to the platinum.

However, the activities of these platinum-containing catalysts for the various reactions are not satisfactorily high (U.S. Pat. No. 5,079,107) so that a catalyst having higher activities, and preferably a longer life is desired.

U.S. Pat. No. 4,985,386 of Tsurumi et al. discloses carbon-supported platinum catalysts containing at least one other metal, including a combination of platinum, iron and manganese. The catalysts of the patented invention are all carburized to form carbides of at least some of these metals, and firmly fix the metals to the carbon supports. Although several examples and comparative examples (uncarburized catalysts) are provided, the combination of platinum, iron and manganese is not exemplified in either form.

SUMMARY OF THE INVENTION

In view of the above drawbacks an object of the present invention is to provide a platinum alloy catalyst having satisfactorily high catalytic activities by selecting new combinations from the known catalyst metals.

Another object is to provide a platinum alloy catalyst having high catalytic activities usefully employed in a fuel cell.

The present invention is a platinum alloy catalyst comprising a carbon support and, platinum, manganese and iron supported thereon, and is preferably noncarburized.

The most characteristic feature of the present invention is to elevate the specific activity of a platinum catalyst metal by adding manganese and iron.

By adding a second metal to a conventional catalyst supporting only platinum and alloying the second metal with the platinum, the activities of the platinum can be elevated, and further activity elevation may be possible by adding a third metal. Especially, the appropriate selection of the second metal can remarkably elevate the activities. Although manganese has been accorded little importance as a possible additional metal, the present inventor has found that a platinum alloy catalysts having higher activities than those of conventional catalysts can be prepared by adding the manganese to a carbon support supporting platinum and iron to reach the present invention.

The activities of these platinum alloy catalysts are higher than those of a binary alloy catalyst consisting of platinum and manganese and even of a platinum-nickel-cobalt alloy catalyst which is one of the most active conventional platinum alloy catalysts, and its life may be greatly extended. Moreover, it is quite useful when utilized as an electrocatalyst of a fuel cell.

DETAILED DESCRIPTION OF THE INVENTION

Figure 1:
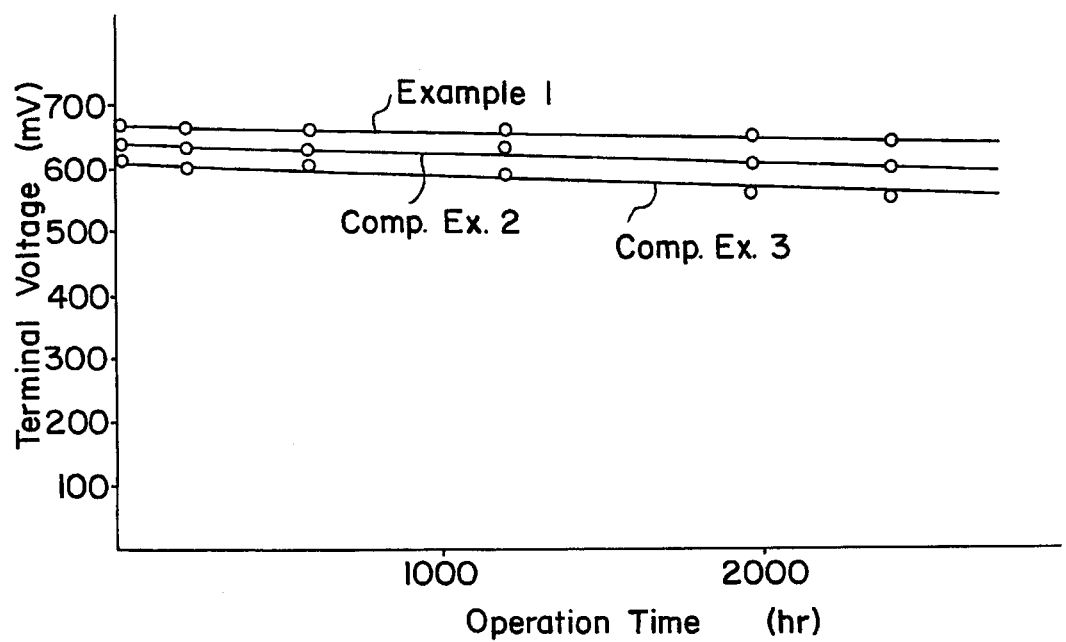
FIG. 1 is a graph showing the variation on time of the terminal voltages of electrodes of Example 1 and Comparative Examples 2 and 3.

In the present invention, carbon are employed as a catalyst support. The carbon includes all the substances all of or most of which is made of carbon such as carbon black, graphite and an element having any form of which a main component is carbon such as active carbon. The carbon support is preferably porous and has a large surface area, for example, between 30 and 2000 $m^2$, and its particle size is desirably between 100 and 5000 Å. Acetylene black (trade name: Shawinigan Acetylene Black or Denka Black or the like), electroconductive carbon black (trade name: Vulcan XC-72 or the like) or graphitized carbon black or the like may be employed.

An exemplary procedure for preparing a platinum alloy catalyst of the present invention is as follows. At first, a platinum metal is supported on a carbon support. The supporting of the platinum can be carried out according to a conventional method. That is, the carbon support is impregnated with a solution of a platinum-containing ion such as a chloroplatinic acid solution and the platinum-containing ion is reduced to be deposited on the carbon support.

Then, the metals other than the platinum, that is, manganese and iron are supported on the carbon support and alloyed with the platinum under heating. The supporting of the manganese and the iron may be conducted by impregnating the carbon support with a solution of a manganese compound such as manganese acetate and of an iron compound such as iron nitrate (III) nonahydrate and agitating the solution for supporting the compounds on the carbon support.

After, if necessary, impurity metals in the metal salts are removed by extraction and dried, the above metal compounds are reduced to the manganese and the iron, for example, in a reduction atmosphere such as in a hydrogen flow at 250° C. for 30 minutes. Then, the temperature is raised to 600° to 1000° C., desirably to 1000° C. and maintained for a relatively long period of time. The reduced metals can be alloyed in 1 to 3 hours.

In the platinum alloy catalyst of the present invention, the composition thereof may preferably be 90 to 40 atomic % of platinum and 5 to 30 atomic % of the respective manganese and iron, and most preferably be 50 atomic % of platinum and 25 atomic % of the manganese and of iron.

Although in the above process the other metals are supported after the platinum, the catalyst of the invention can be prepared by first supporting the other metals and then supporting the platinum and alloying.

EXAMPLES

Although Examples of preparing the platinum alloy catalyst in accordance with the present invention will be illustrated, these are not construed to restrict the invention.

EXAMPLE 1

After chloroplatinic acid containing 1.12 g of platinum was dissolved into 300 milliliters of water in a vessel of which a volume was 0.5 liter, 10 milliliters out of 75 milliliters of liquid dissolving 3 g of $Na_2S_2O_2 \cdot 5H_2O$ was added dropwise to the solution in the vessel in 3 minutes and then the remaining 65 milliliters were added all at once and stirred at 27° C.

On the other hand, 10 g of acetylene black employed as a catalyst support was well suspended in 100 milliliters of pure water which was then added to the above mixed solution. This was stirred for two minutes with a supersonic agitator to penetrate the mixed solution into pores of the support.

The slurry was dried overnight in an oven at 75° to 80° C. to remove water. The dry powder thus obtained was washed three times with about 200 milliliters of distilled water to extract and remove by-products. This slurry was further dried overnight at 70° C. to prepare the carbon support supported with the platinum.

The average particle size of the platinum of the platinum-carbon support catalyst thus obtained was measured to be 18 Å by means of X-ray diffraction, and the platinum particles were observed to have a nearly uniform particle size by means of a transmission microscope. The specific surface area measured in accordance with an electrochemical hydrogen adsortion-desorption method was 155 $m^2$/g and the amount of the supported platinum was 10% in weight.

To a solution prepared by mixing 50 milliliters of a manganese acetate aqueous solution (0.77 mmol) and 50 milliliters of an iron nitrate (III) nonahydrate aqueous solution (0.77 mmol) was added an ammonium hydroxide aqueous solution until pH reached 10, which was stirred for 5 minutes. Then, 3 g of the above carbon support supporting only the platinum was added to the above mixed solution and stirred for 10 minutes.

Thereafter, the drying of the slurry and the reduction in a hydrogen flow were performed to reduce the manganese salt and the iron salt to the manganese and the iron, and the temperature of the atmosphere of the catalyst was raised to 1000° C., and retained for three hours to alloy the platinum with the manganese and the iron. The catalyst was not carburized.

About 3.1 g of the platinum-manganese-iron alloy catalyst could be obtained through the above process. The amounts of the platinum, the manganese and the iron supported in the catalyst were measured to be 0.1 g/g-catalyst, 0.014 g/g-catalyst and 0.014 g/g-catalyst (platinum: 50 atomic %, manganese: 25 atomic % and iron: 50 atomic %), respectively.

The alloy particle size of the platinum-manganese-iron alloy catalyst obtained was measured to be 34 Å.

After a half cell was constructed employing this platinum-manganese-iron alloy catalyst as a cathode of a hot phosphoric acid type fuel cell in an amount of 0.5 mg-Pt/$cm^2$, the activity of the half cell was measured at 1 atm., 190° C. and 900 mV of the oxygen electrode to be 52 mA/mg-Pt.

EXAMPLES 2 AND 3

A platinum-manganese-iron alloy catalyst was prepared by the same procedures as those of Example 1 except that the atomic percentages of the platinum, the manganese and the iron were made to be 40, 30 and 30, respectively (Example 2).

Another platinum-manganese-iron alloy catalyst of which atomic percentages were 90, 5 and 5 in this turn was prepared in the same procedures (Example 3).

The activities of these two catalysts were measured to be 52 and 51 mA/mg-Pt.

COMPARATIVE EXAMPLE 1

After an aqueous solution of ammonium hydroxide was added to 100 milliliters of an aqueous solution of manganese acetate (1.74 mmol) until pH reached to 10, the solution was stirred for five minutes. Then, to the manganese salt aqueous solution of the acetyl amine, 3 g of the platinum-carbon support catalyst prepared in Example 1 was added and stirred for 10 minutes.

Thereafter, the obtained slurry was dried for evaporation at 65° C., and was treated in a 10% hydrogen flow (balance: nitrogen) at 250° C. for 30 minutes for reducing the manganese salt to the manganese. The temperature of the atmosphere of the reduced catalyst was raised to 900° C. for alloying the platinum and the manganese (the average particle size of the alloy was 24 Å). The catalyst was not carburized.

About 3.1 g of a platinum-manganese alloy catalyst was obtained. The amounts of the platinum and the manganese supported on the platinum-manganese alloy catalyst were measured to be 0.1 g/g-catalyst and 0.13 g/g-catalyst, respectively (Pt: 50 atomic %, Mn: 50 atomic %), employing a chemical analysis method. The particle size of the catalyst alloy was 24 Å. The activity of the catalyst was measured in the same manner as that of Example 1 to be 42 mA/mg-Pt.

COMPARATIVE EXAMPLES 1 AND 3

After a platinum-nickel-cobalt alloy catalyst was prepared by the same procedures as those of Example 1, the activity was measured in the same manner as that of Example 1 to be 50 mA/mg-Pt (Comparative Example 2). The activity of the platinum catalyst before the supporting of the manganese and the iron of Example 1 was similarly measured to be 30 mA/mg-Pt (Comparative Example 3).

The atomic percentages and of the respective constituent metals and the activities at 0.9 V (mA/mg-Pt) of the catalysts of the above Example and Comparative Examples are summarized in Table 1.

It can be seen from Table 1 that the activities of the catalyst of Examples of the present invention comprising the platinum, the iron and the manganese are higher than those of the other catalysts, for example, higher than the platinum catalyst by more than 20 mA/mg-Pt, higher than the platinum-manganese catalyst by about 10 mA/mg-Pt and higher than the ternary catalyst containing the platinum by several mA/mg-Pt.

TABLE 1

|  | Supported Metal | Atomic % | Activity at 0.9 V ($O_2$) (mA/mg-Pt) |
|---|---|---|---|
| Example 1 | Pt—Fe—Mn | 50:25:25 | 52 |
| Example 2 | Pt—Fe—Mn | 40:30:30 | 52 |
| Example 3 | Pt—Fe—Mn | 90:5:5 | 51 |
| Comparative Example 1 | Pt—Mn | 50:50 | 42 |
| Comparative Example 2 | Pt—Ni—Co | 50:25:25 | 50 |
| Comparative Example 3 | Pt | — | 30 |

The electrodes of Example 1 and Comparative Examples 2 and 3 were incorporated in single cells which were then operated at 1 atm. and 190° C. The variation on time of the terminal voltage was measured and is summarized in FIG. 1.

It can be seen from FIG. 1 that the platinum-manganese-iron catalyst of Example 1 provides a higher terminal voltage than those of the Comparative Examples from the beginning of the operation. It can also be seen that the terminal voltage of Example 1 is maintained higher than these of the Comparative Examples after a long period of operation time so that the characteristic regarding a life of the catalyst of Example 1 is superior to those of the Comparative Examples.

What is claimed is:

1. A non-carburized platinum alloy catalyst comprising a carbon support and, 40 to 90 atomic % of platinum, 30 to 5 atomic % of manganese and 30 to 5 atomic % of iron supported thereon.

* * * * *